United States Patent [19]

Chen

[11] Patent Number: 4,512,775

[45] Date of Patent: Apr. 23, 1985

[54] COLD FLOW IMPROVER

[75] Inventor: Jackson C. Chen, Baton Rouge, La.

[73] Assignee: Ethyl Corporation, Richmond, Va.

[21] Appl. No.: 538,502

[22] Filed: Oct. 3, 1983

[51] Int. Cl.$^3$ ............................................... C10L 1/18
[52] U.S. Cl. .......................................... 44/62; 44/70; 526/331
[58] Field of Search ....................... 44/62, 70; 526/331

[56] References Cited

U.S. PATENT DOCUMENTS

| | | | |
|---|---|---|---|
| 3,240,766 | 3/1966 | Thomson et al. | 526/331 |
| 3,288,577 | 11/1966 | Patinkin | 44/62 |
| 4,035,329 | 7/1977 | Wiest et al. | 526/331 |
| 4,074,040 | 2/1978 | Oeder et al. | 526/331 |

Primary Examiner—Y. Harris-Smith
Attorney, Agent, or Firm—Donald L. Johnson; John F. Sieberth; W. G. Montgomery

[57] ABSTRACT

Cold flow properties of distillate fuel such as diesel fuel are improved by the addition of a small amount of a tetrapolymer of ethylene, a $C_{3-32}$ α-olefin (e.g. hexene-1), vinyl ester of a $C_{1-12}$ aliphatic monocarboxylic acid (e.g. vinyl acetate) and a vinyl substituted aromatic hydrocarbon (e.g. styrene) having an average molecular weight of 2,000–5,000.

22 Claims, No Drawings

COLD FLOW IMPROVER

BACKGROUND OF THE INVENTION

Liquid hydrocarbon fuels such as diesel, turbine fuel and furnace oil referred to as middle distillate fuel tend to thicken when cooled and if cold enough will not flow. A number of additives usually polymeric in nature have been developed to improve cold flow properties. One of the most successful has been an ethylene vinyl acetate copolymer as described in U.S. Pat. Nos. 3,037,850 and 4,087,255. U.S. Pat. No. 4,087,255 also discloses terpolymers of ethylene, vinyl acetate and $C_{3\text{-}16}$ α-olefins such as propylene. Terpolymers of ethylene, vinyl acetate and either propylene or butylene have been used to lower the pour point of residual fuel oil as shown in U.S. Pat. Nos. 4,178,950 and 4,178,951. Terpolymers of ethylene, vinyl acetate and styrene are reported to be useful as pour point depressants in middle distillate fuel (U.S. Pat. No. 4,362,533). Other patents relating to ethylene, vinyl acetate copolymers which may include other monomers are U.S. Pat. Nos. 3,240,766; 3,297,784; 3,779,992; and 4,035,329.

SUMMARY

According to the present invention a very effective cold flow improver for petroleum middle distillate fuel is provided. The new cold flow improver is a polymer of ethylene, $C_{3\text{-}32}$ α-olefin, a vinyl ester of an aliphatic monocarboxylic acid and a vinyl aromatic hydrocarbon. The term "polymer" is used herein in a generic sense to include copolymers of different monomers including tetrapolymers.

DESCRIPTION OF THE PREFERRED EMBODIMENTS

A preferred embodiment of the invention is a polymer which is effective in lowering the cold flow temperature of middle distillate fuel, said polymer containing (a) about 50 to 90 weight percent of units having the structure —CH$_2$CH$_2$—, (b) about 10 to 40 weight percent of units having the structure

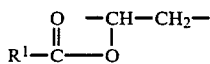

wherein $R^1$ is selected from the group consisting of hydrogen and aliphatic hydrocarbon groups containing 1–11 carbon atoms, (c) about 0.2 to 10 weight percent of units having the structure

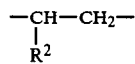

wherein $R^2$ is an aliphatic hydrocarbon group containing 1–28 carbon atoms and (d) about 1 to 30 weight percent of units having the structure

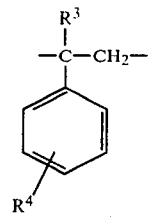

wherein $R^3$ is selected from the group consisting of hydrogen and methyl and $R^4$ is selected from the group consisting of hydrogen and aliphatic hydrocarbons containing 1–30 carbon atoms, said polymer having a number average molecular weight of about 1,000–10,000.

The foregoing polymers are made by a process comprising copolymerizing ethylene, an α-olefin containing 3–30 carbon atoms, a vinyl ester of an aliphatic monocarboxylic acid and a vinyl substituted aromatic hydrocarbon. The weight percent of each comonomer in the resultant polymer is about 50–90 weight percent ethylene, about 0.2–10 weight percent $C_{3\text{-}30}$ α-olefin, 10–40 weight percent vinyl ester of a $C_{1\text{-}12}$ aliphatic monocarboxylic acid and 1–30 weight percent of a vinyl substituted aromatic hydrocarbon. A more preferred composition is 60–85 weight percent ethylene, 0.5–3 weight percent $C_{3\text{-}30}$ α-olefin, 15–35 vinyl ester of a $C_{1\text{-}12}$ aliphatic monocarboxylic acid and 2–25 weight percent vinyl substituted aromatic hydrocarbon.

The molecular weight of the polymer can vary over a wide range. A useful number average molecular weight is about 1000–50,000. A more preferred molecular weight is about 1500–10,000. A most preferred number average molecular weight is about 2000–5000.

Any aliphatic monoolefin can be used including internal olefins such as 2-butene, 2-hexene, 2-octene, 3-dodecene and the like. Alpha-olefins are most preferred.

Useful α-olefins include all monoolefinic aliphatic hydrocarbons containing 3–30 carbon atoms and having an olefinic double bond at a terminal position. Examples of these are propylene, isobutene, 1-pentene, 2-ethyl-1-hexene, 2,2,4-trimethyl-1-pentene, propylene tetramer, 1-octadecene, 3-ethyl-1-eicosene, 4-ethyl-1-tetracosene, 6-ethyl-1-octacosene and the like.

More preferred α-olefins are those containing 3 to about 12 carbon atoms. Still more preferred are the linear α-olefins containing 3–12 carbon atoms such as propylene, 1-butene, 1-pentene, 1-hexene, 1-octene, 1-decene and 1-dodecene including mixtures thereof. Excellent results have been achieved using linear 1-hexene.

Useful vinyl esters of $C_{1\text{-}12}$ aliphatic monocarboxylic acids are vinyl formate, vinyl acetate, vinyl propionate, vinyl butyrate, vinyl decanoate, vinyl laurate and the like including mixtures thereof. The most preferred vinyl ester is vinyl acetate.

Vinyl-substituted aromatic hydrocarbons that can be used to make the polymers include styrene, α-methyl styrene and nuclear $C_{1\text{-}30}$ aliphatic hydrocarbon substituted derivatives thereof such as 4-methyl styrene, 4-dodecyl styrene, 3-methyl-α-methyl styrene, 4-triacontyl styrene and the like including mixtures thereof. Styrene itself is the most preferred vinyl substituted aromatic.

The polymerization is catalyzed by free-radical forming catalysts such as di-tert-butyl peroxide, azobisisobutyronitrile, benzoyl peroxide, dilauroyl peroxide, and the like. The more preferred catalysts are those having a half-life at 130° C. of less than one hour. Examples of such catalysts are octanoyl peroxide, decanoyl peroxide, stearoyl peroxide, t-butyl peroxyisobutyrate, t-butyl peroxymaleic acid, etc. Good results have been achieved by using tert-butyl peroxybenzoate.

The polymerization is preferably conducted in an inert solvent. Such solvents include benzene, toluene, yxlene, hexane, heptane, cyclohexane and the like.

The polymerization is conducted under pressure. A useful pressure range is about 500–5000 psig. A preferred pressure is about 700–2,000 psig.

The polymerization is conducted at a temperature high enough to cause the polymerization to proceed but not so high as to cause an uncontrollable reaction. A useful temperature range is about 80°–200° C. A more preferred temperature range is about 100°–150° C. and a most preferred temperature is about 115°–140° C.

are most useful in petroleum middle distillates. Middle distillate fuel boils in the range of about 250°–750° F. Typical fuels are diesel fuel, jet fuel, gas turbine fuel and furnace oil.

Only a small amount of the new additive is needed to obtain a substantial reduction in cold flow temperature. A useful concentration is about 0.02 to 0.20 weight percent and preferably about 0.03 to 0.10 weight percent.

Cold flow ratings of diesel fuel are measured by the Cold Filter Plugging Point Test (CFPPT) (IP309/76) and the Low Temperature Flow Test (LTFT). The tetrapolymer of this invention was compared to a commercial ethylene-vinyl acetate (EVA) cold flow improver. The diesel fuels were a low-cloud point fuel, a medium cloud point fuel and a high cloud point fuel.

The lowest temperature ratings in the tests are shown in the following table:

|  | Low Cloud Fuel | | | Medium Cloud Fuel | | | High Cloud Fuel | | |
|---|---|---|---|---|---|---|---|---|---|
|  | None[1] | EVA[2] | Tetra[3] | None | EVA | Tetra | None | EVA | Tetra |
| Cloud Pt. | −19 |  | −23 | −11 | −11 | −11 | −1 | −3 | −3 |
| LTFT | −19 | −29 | −29 | −8 | −14 | −17 | −2 | −6 | −4 |
| CFPP | −28 | −38 | −40 | −10 | −17 | −24 | −3 | −9 | −6 |
| Pour Pt. | −29 |  | <−46 | −23 | <−46 | <−46 | −7 | −23 | −40 |

[1]Non-additive base fuel.
[2]Commercial EVA cold flow improver
[3]Tetrapolymer of example 1.

The polymerization may be conducted in any of a number of ways well-known to polymer chemists. In one method a solvent and catalyst are placed in a heated pressure reactor and ethylene, α-olefin, vinyl ester and vinyl aromatic are concurrently pumped into the reactor. In another method the olefin, vinyl ester and vinyl aromatic are mixed together in the desired ratio and the mixture and ethylene are concurrently pumped into the heated reactor containing inert solvent and catalyst. Preferably not all of the catalyst is added at the start of the reaction. Catalyst can be added during the reaction by periodically or continuously pumping in solvent containing the free-radical forming catalyst.

The following examples illustrate the preparation of the new polymeric cold flow improvers.

EXAMPLE 1

An autoclave was flushed with nitrogen and then with ethylene. The autoclave was then pressurized with ethylene to 400 psig. and heated to 125° C. More ethylene was pumped in up to 1050 psig.

A comonomer mixture of 240 g. vinyl acetate, 45 g. styrene and 15 g. 1-hexene was prepared. A catalyst solution of 10.2 g. tert-butyl peroxybenzoate in 89.8 g. cyclohexane was also prepared. The comonomer mixture and catalyst solution were fed simultaneously into the pressurized autoclave. Comonomer feed was at 37.5 ml/hour and catalyst feed was at 30 ml/hour. Ethylene was fed to maintain 1050±50 psig. Comonomer feed was stopped after two hours and catalyst feed was stopped after 2.5 hours. Stirring was continued for one hour and the mixture was cooled to 60° C. The autoclave was vented and discharged. The solution was filtered and the solvent stripped off at 15–20 mm. Hg over a steam bath to constant weight.

The new cold flow improvers can be used in any liquid hydrocarbon in need of having a lower pour point or improved cold flow properties. They can be used in crude oil, petroleum residual fuel, petroleum distillate fuel, lubricating oils and the like. The additives These tests show that the new tetrapolymers are very effective cold flow improvers and are especially effective in low-cloud and medium cloud diesel fuels.

I claim:

1. A polymer which is effective in lowering the cold flow temperature of middle distillate fuel, said polymer containing (a) about 50 to 90 weight percent of units having the structure —CH$_2$CH$_2$—, (b) about 10 to 40 weight percent of units having the structure

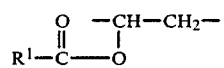

wherein R$^1$ is selected from the group consisting of hydrogen and aliphatic hydrocarbon groups containing 1–11 carbon atoms, (c) about 0.2 to 10 weight percent of units having the structure

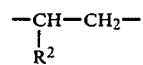

wherein R$^2$ is an aliphatic hydrocarbon group containing 1–28 carbon atoms and (d) about 1 to 30 weight percent of units having the structure

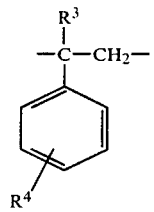

wherein R$^3$ is selected from the group consisting of hydrogen and methyl and R$^4$ is selected from the group consisting of hydrogen and aliphatic hydrocarbons containing 1-30 carbon atoms, said polymer having a number average molecular weight of about 1,000-10,000.

2. A polymer of claim 1 wherein $R^1$ is an alkyl group of 1-4 carbon atoms.

3. A polymer of claim 2 wherein $R^2$ is an aliphatic hydrocarbon group of about 1-10 carbon atoms.

4. A polymer of claim 3 wherein $R^3$ and $R^4$ are hydrogen.

5. A polymer of claim 2 wherein $R^1$ is methyl.

6. A polymer of claim 5 wherein R is n-butyl.

7. A polymer of claim 6 having a number average molecular weight of about 2,000 to 5,000.

8. A process for making a polymer which is an effective cold flow improver in middle distillate fuel said process comprising polymerizing:
(a) ethylene,
(b) an olefin containing 3-30 carbon atoms,
(c) a vinyl ester of a fatty acid containing 1-12 carbon atoms and,
(d) a vinyl substituted aromatic hydrocarbon selected from the group consisting of styrene, α-methyl styrene and nuclear substituted derivatives thereof wherein the nuclear substituents are aliphatic hydrocarbon groups containing 1-30 carbon atoms in an inert solvent at a pressure sufficient to maintain a liquid phase at a polymerization temperature of 80° to 200° C. in the presence of a catalytic amount of a free-radical generating catalyst.

9. A process of claim 8 which comprises polymerizing:
(a) 50 to 90 parts by weight of ethylene,
(b) 0.2 to 10 parts by weight of a linear α-olefin containing 3-30 carbon atoms,
(c) 10 to 40 parts by weight of vinyl acetate and
(d) 1 to 30 parts by weight of styrene.

10. A process of claim 9 which comprises
(A) forming a mixture of 1 to 20 weight percent linear α-olefin containing 3-12 carbon atoms, 50 to 90 weight percent vinyl acetate and 1 to 49 weight percent styrene to form a comonomer mixture
(B) forming a solution of a free-radical generating catalyst in an inert hydrocarbon solvent to form a catalyst solution
(C) pressurizing a reaction vessel with ethylene to an ethylene pressure of 600 to 2,000 psig.
(D) simultaneously feeding said comonomer mixture and said catalyst solution to said reaction vessel while adding ethylene sufficient to maintain a pressure of 600 to 2,000 psig. and reacting said comonomer mixture and said ethylene at a temperature of about 100° to 150° C. until the average number molecular weight of the resultant polymer is about 2,000 to 5,000.

11. A process of claim 9 wherein said linear α-olefin is α-hexene.

12. A distillate petroleum fuel containing an amount sufficient to improve cold flow properties of a polymer having a number average molecular weight of about 1,000-10,000 and containing (a) about 50 to 90 weight percent of units having the structure $CH_2CH_2$, (b) about 10 to 40 weight percent of units having the structure

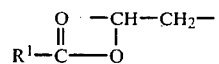

wherein $R^1$ is selected from the group consisting of hydrogen and aliphatic hydrocarbon groups containing 1-11 carbon atoms, (c) about 0.2 to 10 weight percent of units having the structure

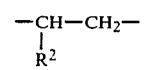

wherein $R^2$ is an aliphatic hydrocarbon group containing 1-28 carbon atoms and (d) about 1 to 30 weight percent of units having the structure

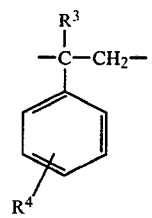

wherein $R^3$ is selected from the group consisting of hydrogen and methyl and $R^4$ is selected from the group consisting of hydrogen and aliphatic hydrocarbons containing 1-30 carbon atoms.

13. A distillate fuel composition of claim 12 wherein $R^1$ is an alkyl group of 1-4 carbon atoms.

14. A distillate fuel composition of claim 11 wherein $R^2$ is an aliphatic hydrocarbon groups of about 1-10 carbon atoms.

15. A distillate fuel composition of claim 14 wherein $R^3$ and $R^4$ are hydrogen.

16. A distillate fuel of claim 13 wherein $R^1$ is methyl.

17. A distillate fuel of claim 16 wherein $R^2$ is n-butyl.

18. A distillate fuel of claim 17 wherein said polymer has a number average molecular weight of 2,000 to 5,000.

19. A distillate petroleum fuel containing an amount sufficient to improve cold flow properties of a polymer having a number average molecular weight of about 2,000-5,000, said polymer being made by a process comprising polymerizing about 60-85 weight percent ethylene, 0.5-3 weight percent $C_{3-12}$ α-olefin, 15-35 weight percent vinyl acetate, and 2-25 weight percent styrene at a pressure of about 700-2,000 psig. at a temperature of about 100°-150° C. in the presence of a free-radical generating catalyst and in an inert solvent.

20. A distillate fuel of claim 19 wherein said α-olefin is 1-hexene.

21. A distillate fuel of claim 19 wherein said catalyst is a peroxide having a half-life at 130° C. of less than one hour.

22. A distillate fuel of claim 20 wherein said solvent is cyclohexane and said catalyst is tert-butyl peroxybenzoate.

* * * * *